US012722951B2

(12) United States Patent
Yoon et al.

(10) Patent No.: US 12,722,951 B2
(45) Date of Patent: Sep. 1, 2026

(54) AUTONOMOUS ROBOT WITH PALLET LOADING CAPABILITY

(71) Applicant: BSTAR Robotics Inc., Sunnyvale, CA (US)

(72) Inventors: Jihyun Yoon, Palo Alto, CA (US); Myungok Shin, Burlingame, CA (US); Jongsang Suh, Hayward, CA (US)

(73) Assignee: BSTAR Robotics Inc.

( * ) Notice: Subject to any disclaimer, the term of this patent is extended or adjusted under 35 U.S.C. 154(b) by 399 days.

(21) Appl. No.: 18/474,141

(22) Filed: Sep. 25, 2023

(65) Prior Publication Data

US 2025/0100856 A1 Mar. 27, 2025

(51) Int. Cl.
*B66F 9/06* (2006.01)
*B66F 9/12* (2006.01)
*B66F 9/20* (2006.01)

(52) U.S. Cl.
CPC .............. *B66F 9/063* (2013.01); *B66F 9/122* (2013.01); *B66F 9/205* (2013.01)

(58) Field of Classification Search
CPC .......... B66F 9/063; B66F 9/122; B66F 9/205; B66F 9/0755; B66F 3/38; B66C 3/005; B60S 9/12; B60F 9/12
See application file for complete search history.

(56) References Cited

U.S. PATENT DOCUMENTS

2020/0384905 A1* 12/2020 Topcan ................... B66F 9/122
2022/0063969 A1* 3/2022 Marshall ............. B66F 9/07568
2024/0025716 A1* 1/2024 Wang ...................... B66F 9/063

FOREIGN PATENT DOCUMENTS

CN 216638816 U * 5/2022 .............. B66F 9/075
CN 114684749 A * 7/2022 .............. B66F 9/122
CN 217256302 U * 8/2022 ................ B66F 9/06
CN 115744744 A * 3/2023 .............. B66F 9/075
WO WO-2023153600 A1 * 8/2023 .............. B25J 13/08

OTHER PUBLICATIONS https://youtu.be/2Adze9irZJ8?si=3HhaHGp4bhhlFkJm (You tube video: Aug. 7, 2023: Hereinafter ESA Mobile Robot) (Year: 2023).*
https://www.youtube.com/watch?v=6LZX6dWrSTk (You tube video: May 18, 2023 : Hereinafter Tusk Robot) (Year: 2023).*

* cited by examiner

*Primary Examiner* — Saul Rodriguez
*Assistant Examiner* — Jaimin G Patel
(74) *Attorney, Agent, or Firm* — WTA IP Law P.C.

(57) ABSTRACT

Embodiments relate to an autonomous robot including forks for loading a pallet onto its body. With the pallet loaded, the autonomous robot moves to a target location and then unloads the pallet automatically. To load the pallet, the forks are inserted below the top deckboard of the pallet, and then raised by lifting devices. The body of the autonomous robot is moved forward while retracting the forks to place the body under the pallet. Then the forks are lowered to mount the pallet onto the upper surface of the body. The autonomous robot navigates to the target location automatically, and then unloads the pallet by lifting the pallet from the upper surface of the body. Such loading or unloading of the pallet by the autonomous robot is performed autonomously without using additional equipment or manual involvement.

17 Claims, 9 Drawing Sheets

AUTONOMOUS ROBOT WITH PALLET LOADING CAPABILITY

BACKGROUND

1. Field of Art

The disclosure relates to an autonomous robot, more specifically to an autonomous robot with capability to automatically load and unload pallets.

2. Description of the Related Art

Pallets are portable platforms used to move and store loads of goods. The pallets stabilize loads and enable easy handling using equipment such as forklifts. The pallets generally come in standardized sizes for efficient storage. Pallets are versatile, cost-effective, and eco-friendly, making them widely used in handling freight, cargo and goods in various industries.

These pallets are typically moved around using material handling equipment such as forklifts, pallet jacks, conveyor systems, or automated guided vehicles (AGVs). These tools are designed to lift, transport, and position pallets with ease, allowing for efficient movement within warehouses, factories, and during transportation processes. Forklifts are the most common and versatile equipment used for handling pallets, as they can lift and maneuver them both horizontally and vertically.

However, the forklifts require skilled human operators and are yet to be fully automated. Even when AGVs are used, the loading and unloading of pallets involve human intervention and/or special mounting/dismounting devices. These loading/unloading operations are difficult to automate especially due to changes in environment surrounding the AGVs as well as the differences in the configuration of each of the pallets. Therefore, manual operations associated with loading/unloading of pallets contribute to overall increase in cost and lowered efficiency.

SUMMARY

Embodiments relate to an autonomous robot including forks movable relative to a body of the robot to lift a pallet and mount onto an upper surface of the body. The body includes at least one wheel that is driven to move the body, an actuator to move the forks relative to the body, and a controller for operating the wheel and the actuator. Each of the forks include one or more lifting devices operated by the controller circuit to lift the pallet to load the pallet onto the upper surface of the body and lower the loaded pallet to unload the pallet from the upper surface of the body.

In one or more embodiments, each of the forks is movable between a retracted position and an extended position. Each of the forks is placed between leg members of the body in the retracted position, and each of the forks extend away from the legs in their extended position.

In one or more embodiments, the body includes a first leg member, a second leg member and a third leg member, each having a part of the upper surface. The second leg member and the first leg member extend parallel to the direction in which the first leg member extends. The second leg member and the third leg member are also spaced away from the first leg member to accommodate a first fork and a second fork in the space between the leg members.

In one or more embodiments, the controller circuit lifts the pallet by operating the one or more lifting devices with each of the forks in the extended position. The body is moved below the pallet by operating the at least one wheel and the each of the forks is moved into the retracted position from the extended position by operating the actuator after lifting the pallet in the extended position. The pallet is loaded onto the upper surface of the body by operating the lifting devices after moving each of the forks into the retracted position.

In one or more embodiments, the controller circuit causes the pallet to be lifted from the upper surface of the body by operating the lifting devices with each of the forks in the retracted position. The body is moved away from a location below the pallet by operating the at least one wheel and each of the forks is moved from the retracted position into the extended position by operating the actuator after lifting the pallet in the retracted position. The pallet is lowered onto a ground surface by operating the lifting devices after moving each of the forks into the extended position.

In one or more embodiments, the controller circuit coordinates the moving of the body and the moving of each of the forks so that the pallet remains in a stationary location until the body is placed below the pallet.

In one or more embodiments, each of the forks includes a camera at its end to capture an image including at least a portion of the pallet on the ground surface. The controller circuit controls the degree of extending each of the forks relative to the body before operating the lifting devices.

In one or more embodiments, the body includes at least one lidar. The controller circuit operates the wheel using signal from the at least one lidar to move the autonomous robot.

In one or more embodiments, each of the lifting devices includes a set of extendable columns or a jack.

In one or more embodiments, the set of extendible columns or the jacks are movable along a longitudinal direction of each of the forks to balance the weight distribution of the pallet and its load on the forks.

In one or more embodiments, the body includes a camera or a proximity sensor at a front portion of the body to detect the pallet. The controller circuit receives signals from the camera or the proximity sensor to operate the at least one wheel.

BRIEF DESCRIPTION OF THE DRAWINGS

Figure

DETAILED DESCRIPTION OF EMBODIMENTS

Figure 1:
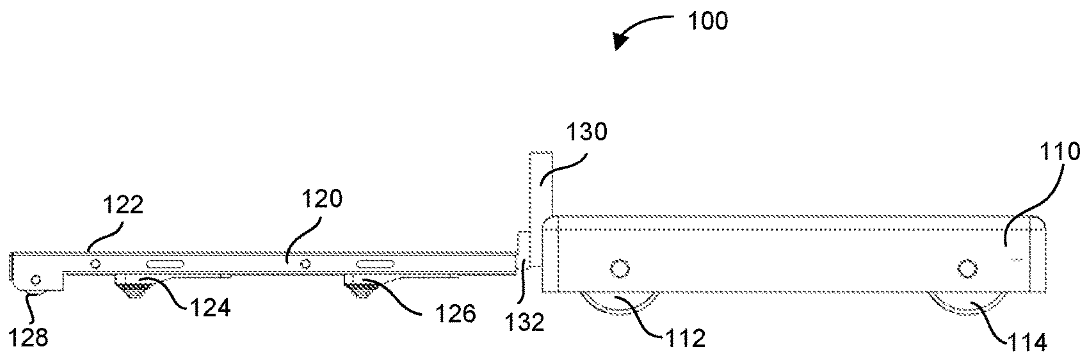
(FIG. 1 is a front view of an autonomous robot with its forks lowered, according to one embodiment.

Embodiments are described herein with reference to the accompanying drawings. Principles disclosed herein may, however, be embodied in many different forms and should not be construed as being limited to the embodiments set forth herein. In the description, details of well-known features and techniques may be omitted to avoid unnecessarily obscuring the features of the embodiments. In the drawings, like reference numerals in the drawings denote like elements. The shape, size and regions, and the like, of the drawing may be exaggerated for clarity.

Embodiments relate to an autonomous robot including forks for loading a pallet onto its body automatically. The autonomous robot carries the pallet to a target unloading location and automatically unloads the pallet using the forks. To raise the pallet, the forks are inserted below a top deckboard of the pallet, and then their lifting devices are activated. After raising the forks, the body of the autonomous robot is moved forward while retracting the forks, and then the forks are lowered to mount the pallet onto the upper surface of the body. The autonomous robot navigates to the target location automatically, and then unloads the pallet by lifting the pallet from the upper surface of the body. Such loading or unloading of the pallet by the autonomous robot is performed autonomously without using additional equipment or manual involvement.

A pallet as described herein refers to a platform for mounting a load or the platform that is mounted with the load. The platform is generally loaded with a load such as a crate, a box or a container, and hence, the pallet described herein may refer to the combination of the platform and its load. The platform may be made of various materials such as wood, plastic and metal.

FIG. 1 is a front view of autonomous robot 100 with its forks 120, 320 lowered, according to one embodiment. Autonomous robot 100 may include, among other parts, body 110, and forks 120, 320 attached to body 110. Body 110 is a part of autonomous robot 100 that includes wheels 112, 114, 412, 414 for moving autonomous robot 100 between different locations. Body 110 may include one or more power sources and has an upper surface on which a pallet and its load may be mounted. Autonomous robot 100 may include various other parts not illustrated in FIG. 1 such as connectors for docking with a charging station.

Figure 2:
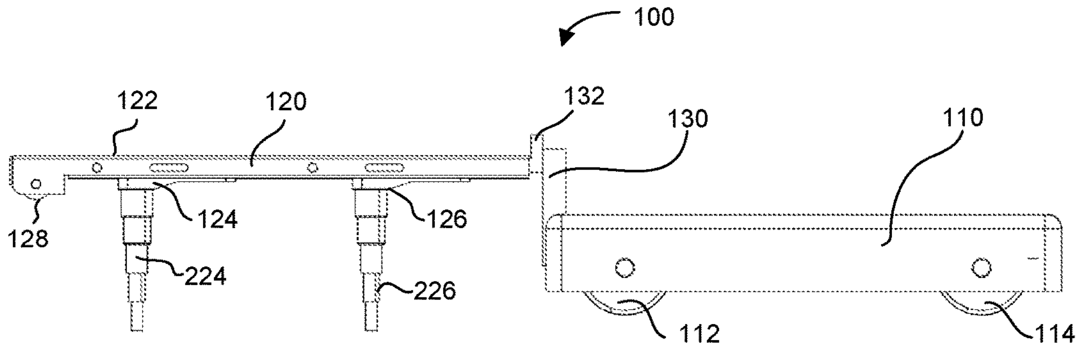
FIG. 2 is a front view of the autonomous robot of FIG. 1 with its forks raised, according to one embodiment.

Forks 120, 320 are mounted to carriages 130, 330 via holders 132, 332, respectively. Carriages 130, 330 are connected to a center leg member 314 of body 110. Carriages 130, 330 may move the forks between an extended position (e.g., shown in FIGS. 6A through 6D) and a retracted position (e.g., shown in FIGS. 6E and 6F). Holders 132, 332 are secured to forks 120, 320 and are slidable relative to carriages 130, 330 to vertically raise or lower the forks 120, 320 by operating their lifting devices 124, 126, 424, 426 at the bottom of the forks 120, 320. The lifting devices 124, 126, 424, 426 may be in a lowered state (e.g., as shown in FIG. 1) or a raised state (e.g., as shown in FIG. 2). Example lifting devices are described below in detail with reference to FIGS. 8 and 9. Forks 120, 320 further include top surfaces 122, 328 on which the pallet is placed. In one or more embodiments, forks 120, 320 include rollers 128, 428 at their ends to support the forks 120, 320 on the ground surface in a slidable manner. Further, forks 120, 320 may extend longitudinally parallel to each other.

In other embodiments, forks may have a different shape and/or include fewer or more forks than what are illustrated in FIG. 1. For example, an autonomous robot may include only a single fork or three or more forks. Further, the shape of the fork may be elliptic or be irregular (instead of being rectangular) to fit the configuration of pallets being carried by the autonomous robot.

FIG. 2 is a front view of autonomous robot 100 of FIG. 1 with its forks 120, 320 raised, according to one embodiment. Forks 120, 320 are raised by operating their lifting devices 124, 126, 424, 426. In the example shown in FIG. 2, each of lifting devices 124, 126, 424, 426 includes a set of columns 224, 226 in cylindrical shapes. The columns 224, 226 in lifting devices 124, 126, 424, 426 may expand or contract by operating an electrical motor, a pneumatic actuator or a hydraulic actuator included in the lifting devices. For this purpose, the lifting devices 124, 126, 424, 426 may be connected to a power source or a pressure source, typically located in body 110.

Figure 3:
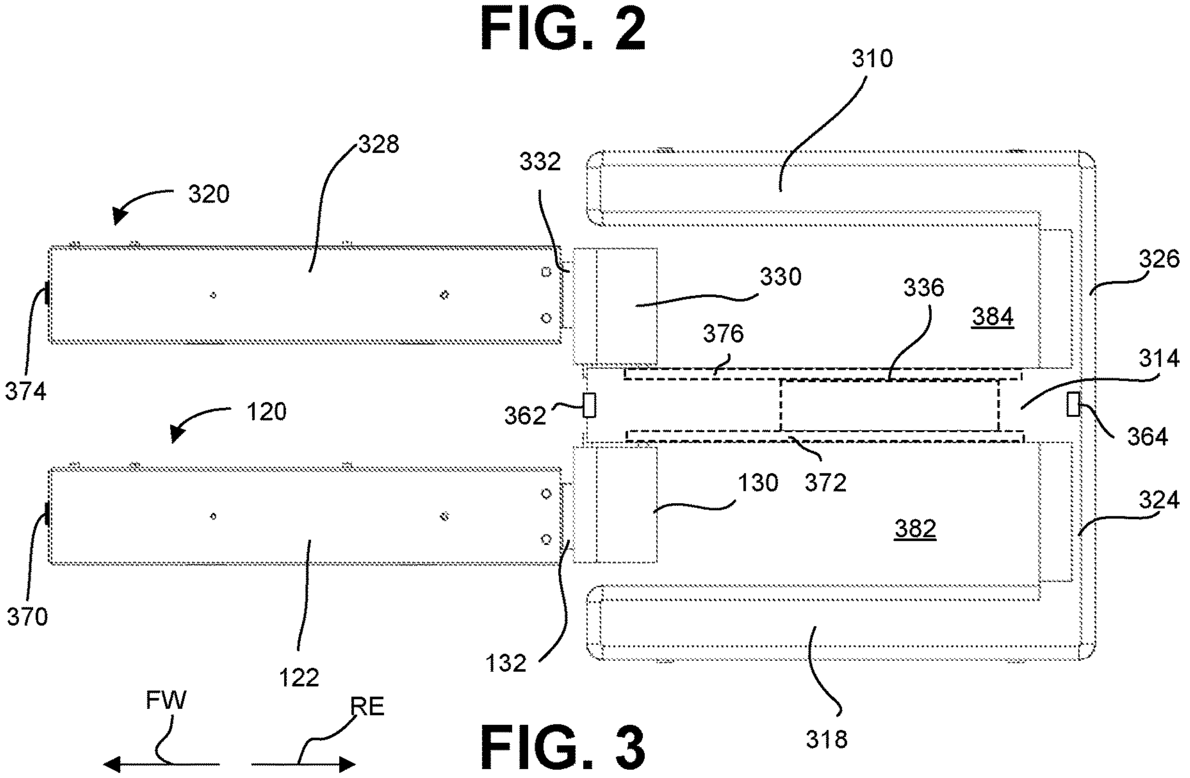
FIG. 3 is a top view of the autonomous robot, according to one embodiment.

FIG. 3 is a top view of autonomous robot 100, according to one embodiment. Body 110 may include, among other members, a center leg member 314, a first side leg member 310 and a second side leg member 318. First side leg member 310 is connected to center leg member 314 via a first connection frame 326 while second side leg member 318 is connected to center leg member 314 via a second connection frame 324.

Various sensors may be provided on autonomous robot 100. In one embodiment, body 110 includes a front lidar 362 and a rear lidar 364 to detect the environment in which autonomous robot 100 operates. Using signals from these lidars and other sensors, controller circuit 336 of autonomous robot 100 may operate its wheels 112, 114, 412, 414 to navigate around the environment to pick up pallets and unload the pallets. Controller circuit 336 may be installed in body 110 as a single component or may include multiple components circuits placed in different portions of body 110 and forks 120, 320. The structure of controller circuit 336 is described below in detail with reference to FIG. 10.

Space 382, 384 are provided by separating first side leg member 310 and second side leg member 318 from center leg member 314 by a distance in opposite lateral directions. In the retracted position, forks 120, 320 are accommodated in space 382, 384 by moving carriages 130, 330 in the rearward direction (as indicated by arrow RE) by actuators 372, 376. Actuators 372, 376 may be embodied, for example, as a chain and sprockets in combination with an electric or hydraulic motor. Alternatively, actuators 372, 376 may be embodied as a pneumatic system using air pressure. Conversely, in the extended position, forks 120, 320 protrude away from space 382, 384 by moving carriages 130, 330 in the forward direction (as indicated by arrow FW) by actuators 372, 376. Actuators 372, 376 are operated by control signals received from controller circuit 336.

In one or more embodiments, cameras 370, 374 are mounted on forks 120, 320. Cameras 370, 374 may be placed on locations of the forks (e.g., front end of the forks 120, 320) and oriented in a direction so that images of at least portions of the pallet on the ground surface may be captured. Cameras 370, 374 may also be configured to capture the ground surface and/or other features in the environment to facilitate the loading/unloading of the pallet as well as navigating around the environment. Sensor signals from cameras 370, 374 may be sent to controller circuit 336 for image processing. Additional sensors such as a proximity sensor may be provided on forks 120, 320 to increase the accuracy of pallet loading/unloading operations.

Figure 4:
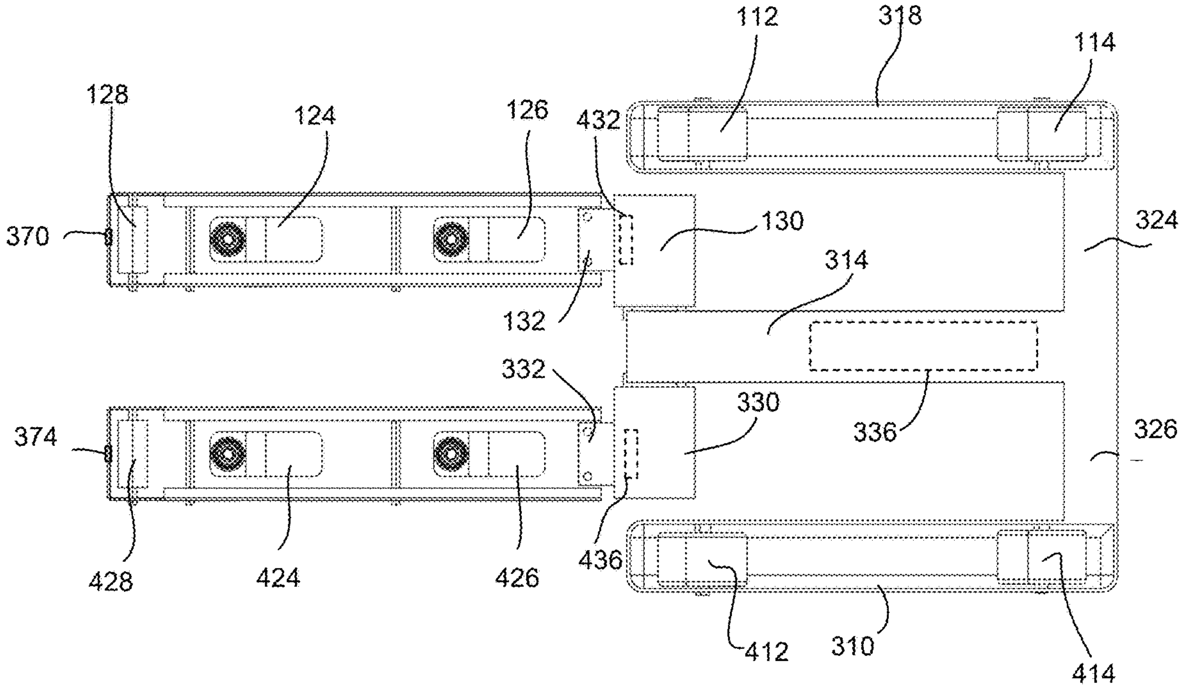
FIG. 4 is a bottom view of the autonomous robot, according to one embodiment.
Figure 5:
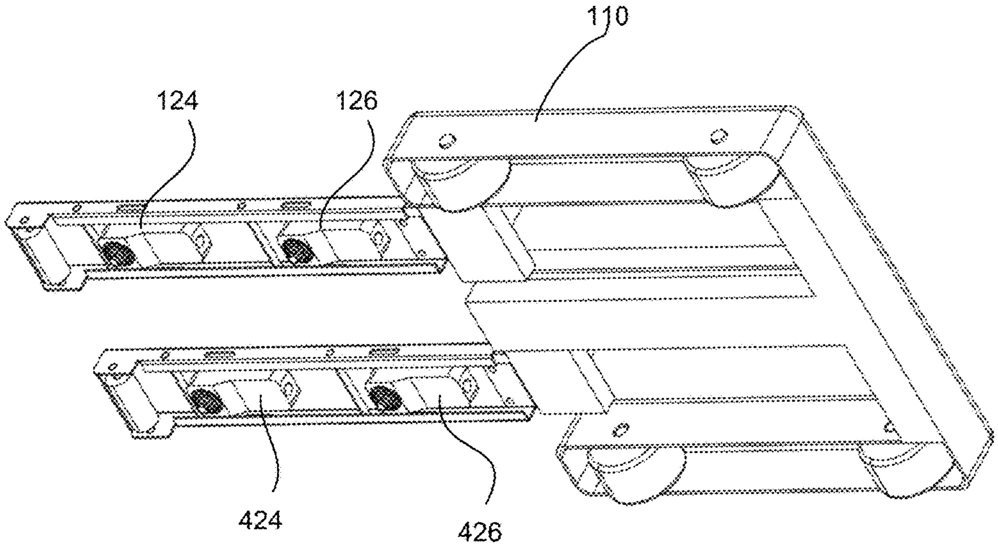
FIG. 5 is a perspective view of the autonomous robot, according to one embodiment.

FIG. 4 is a bottom view of autonomous robot 100 and FIG. 5 is a perspective view of autonomous robot 100, according to one embodiment. Autonomous robot 100 may include mechanisms 432, 436 that facilitate raising or lowering of forks 120, 320. Such mechanisms 432, 436 may be embodied as bearings between holders 132, 332 and carriages 130, 220.

Although only two forks 120, 320 are illustrated in autonomous robot 100 of FIGS. 1 through 5, more forks or only a single fork may be provided to load or unload pallets.

Figure 6A:
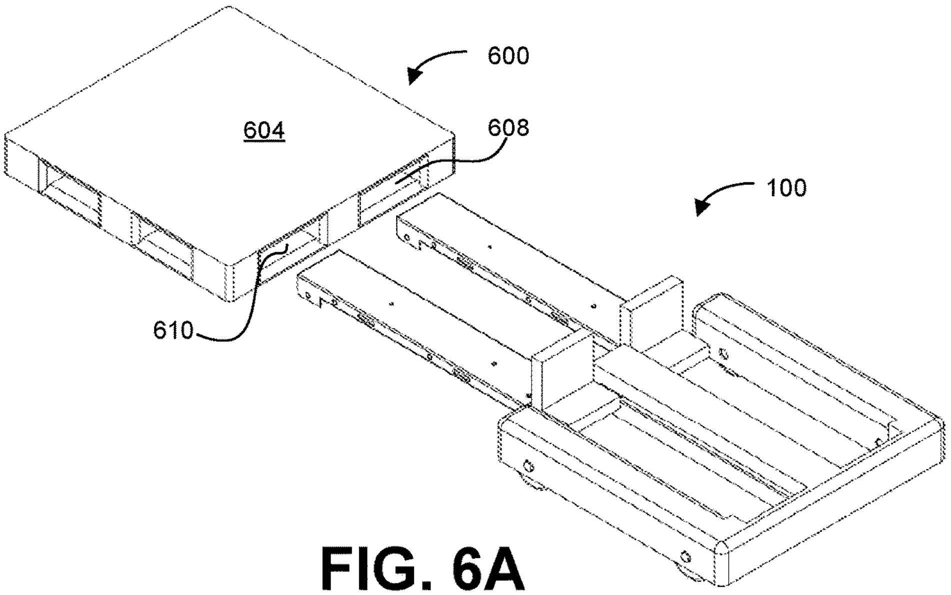
FIGS. 6A through 6F are diagrams illustrating operation of the autonomous robot, according to one embodiment.
Figure 6B:
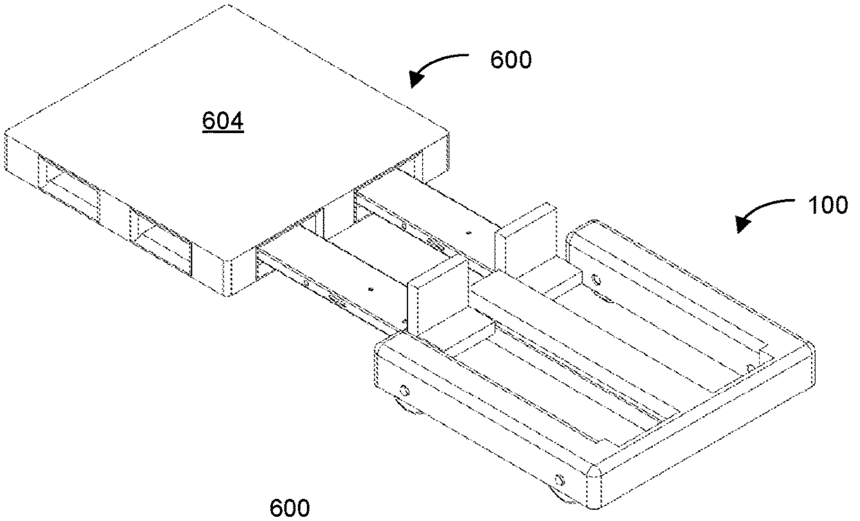
Figure 6C:
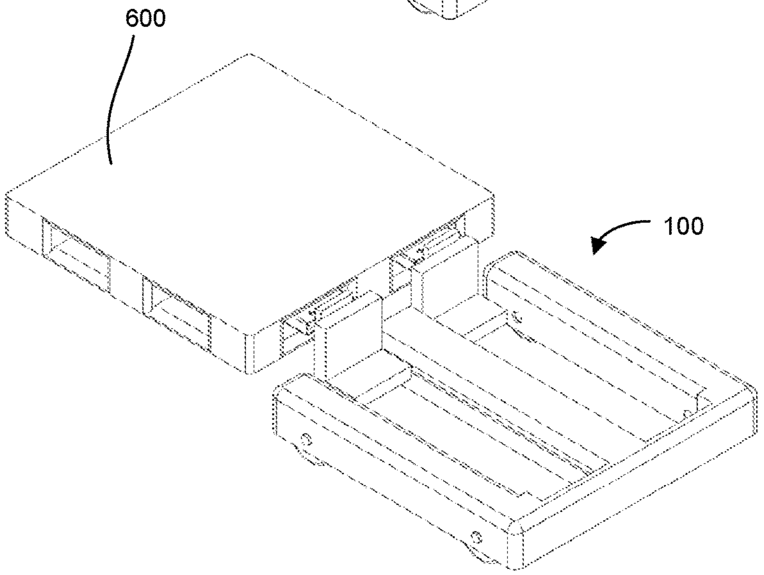

FIGS. 6A through 6F are diagrams illustrating the operations of autonomous robot 100, according to one embodiment. First, autonomous robot 100 is moved to a predetermined location relative to pallet 600 with its forks retracted. Then lowered and in the extended state, as shown in FIG. 6A. Then, autonomous robot 100 is moved forward to insert the forks into entries 608, 610 below top deckboard 604 of pallet 600, as shown in FIG. 6B, until the forks are inserted fully into entries 608, 610 as shown in FIG. 6C.

Alternatively, autonomous robot 100 may approach pallet 600 with its forks in the retracted position. Once autonomous robot 100 is placed within a predetermined distance from pallet 600, the forks are moved from the retracted position to the extended position so that the forks are moved into entries 608, 610 by operating actuators 372, 376 to reach the state as illustrated in FIG. 6C.

Figure 6D:
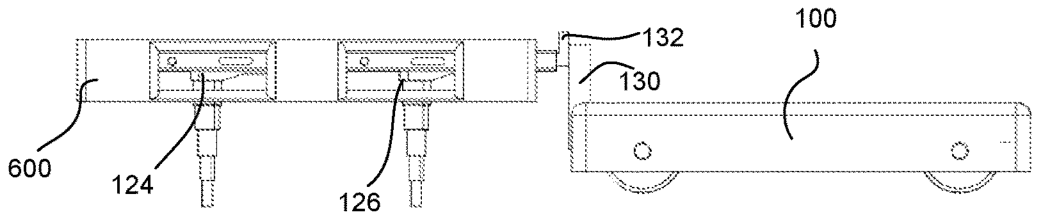

Then, lifting devices 124, 126, 424, 426 are activated to raise pallet 600, as illustrated in FIG. 6D. During the raising of pallet 600, uppers surfaces 122, 328 of forks 120, 320 support the bottom surface of the deckboard 604 of pallet 600. As a result, holders 132, 332 attached to the ends of forks 120, 320 slide upward relative to carriages 130, 330.

Figure 6E:
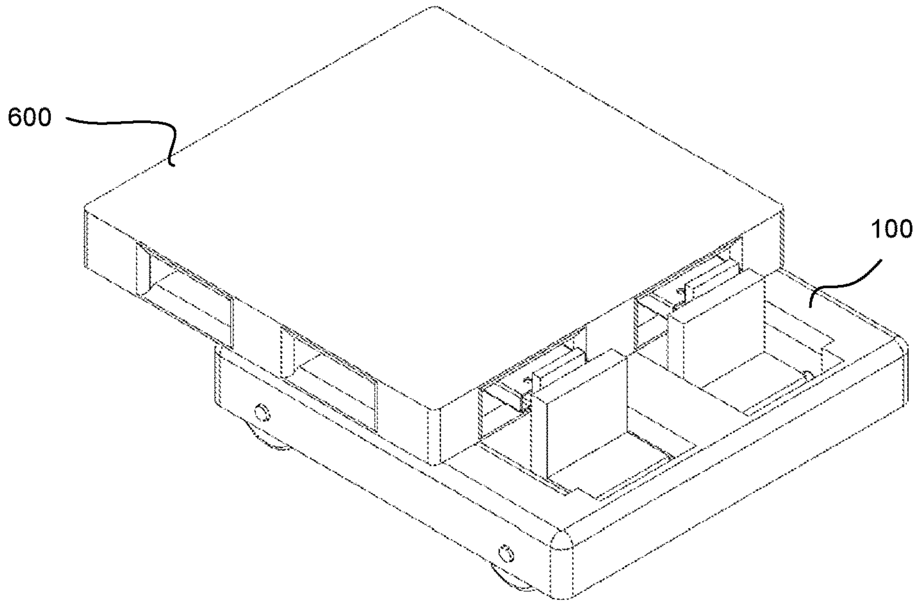
Figure 6F:
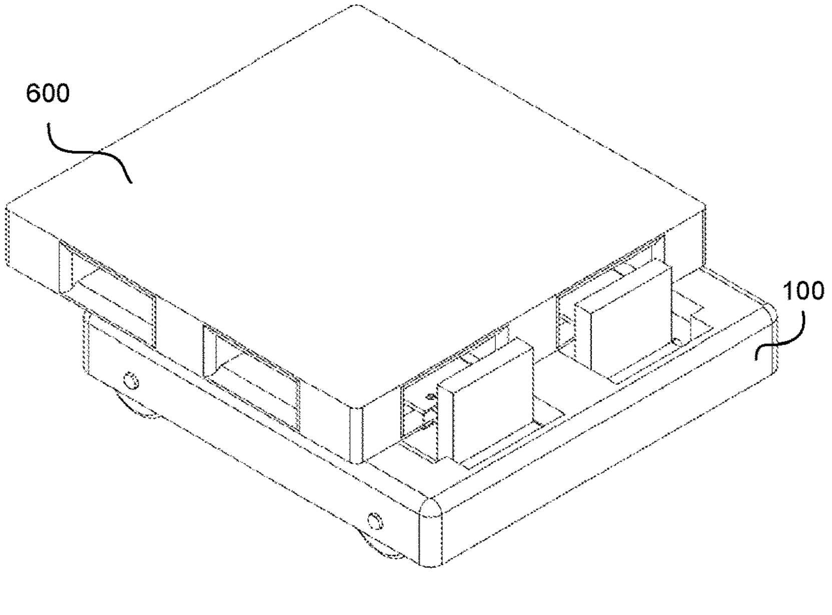

After raising pallet 600, controller circuit 336 of autonomous robot 100 sends control signals to wheels 112, 114, 412, 414 to move body 110 of autonomous robot 100 in the forward direction while also sending control signals to actuators 372, 376 to retract forks 120, 320 as shown in FIG. 6E. By coordinating the movement of the body 110 and the actuators 372, 276, the forks remain in a stationary position while the body 110 is placed under pallet 600. After body 110 moves below pallet 600 and forks 120, 320 reach the fully retracted position, lifting devices 124, 126, 424, 426 are retracted to lower pallet 600 onto the upper surfaces of body 110, as shown in FIG. 6F. By keeping pallet 600 (at its load) in a same horizontal location and moving body 110 of autonomous robot 100 below pallet 600, the risk of dismounting or toppling any load on pallet 600 may be reduced.

After pallet 600 is loaded onto body 110, autonomous robot 100 may operate its wheels to navigate to a target unloading location. During such movement of autonomous robot 100, controller circuit 336 may communicate with front lidar 362, rear lidar 364 and other sensors provided on autonomous robot 100, and control wheels 112, 114, 412, 414 according to software executed on controller circuit 336. In one embodiment, wheels 112, 114, 412, 414 may be rotated with different rates to make turns during the navigation. In other embodiments, one or more additional steering wheels may be provided on autonomous robot 100 to control the turning of autonomous robot 100.

After reaching the target unloading location, the sequence of operations reverse to FIGS. 6A through 6F are performed to unload pallet 600 onto the ground surface at the target unloading location.

Figure 7:
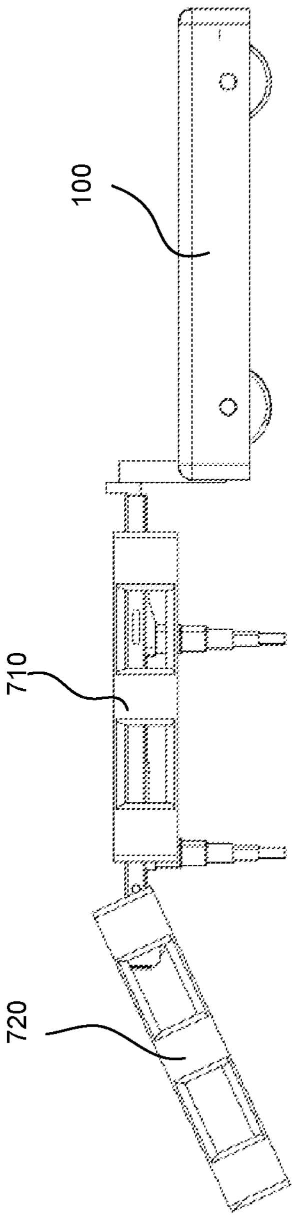
FIG. 7 is a front view of the autonomous robot illustrating lifting one pallet while toppling another pallet.

FIG. 7 is a front view of autonomous robot 100 illustrating lifting of pallet 710 while toppling over pallet 720. When pallets are closely located, forks 120, 320 may extend into the entries (e.g., 608, 610) of a target pallet (e.g., pallet 710), and then further into the entries of an adjacent pallet (e.g., pallet 720). In such case, the raising of forks 120, 320 to life the target pallet may cause the adjacent pallet (e.g., pallet 720) to topple over. Further, if the entries of the target pallet (e.g., pallet 710) and the entries of the adjacent pallet (e.g., pallet 720) are not aligned, extending forks 120, 320 beyond the target pallet may undesirably push the adjacent pallet, disturbing the adjacent pallet or causing the load on the adjacent pallet to fall or dislocate.

Hence, to prevent such undesirable impact on the adjacent pallet, cameras 370, 374 capture the images at the front of forks 120, 320. Controller circuit 336 receives the captured images, performs processing of the captured images, and determines the presence and the location of the adjacent pallet. Based on the determination, controller circuit 336 controls the extended lengths of forks 120, 320 or the moving distance of autonomous robot 100 in the forward direction. The extension of forks 120, 320 or the movement of autonomous robot 100 is stopped before the front ends of forks 120, 320 reach the entries of the adjacent pallet. In this way, unintentional disruption or toppling of pallets adjacent to the target pallet may be prevented. In one or more embodiments, proximity sensors may also be provided at the ends of forks 120, 320 to increase the accuracy of detecting the adjacent pallet.

Due to the presence of the adjacent pallet or other obstacles (e.g., a wall) next to the target pallet, forks 120, 320 may sometimes not extend sufficiently into the entries of the target pallet. In such case, after initially loading the target pallet onto the upper surface of body 110, an adjustment operation may be performed to better position the target pallet on body 110. For example, after initially loading the target pallet onto body 110, the lowering of forks 120, 320 followed by slightly moving forks 120, 320 in the forward direction are performed. Then, forks 120, 320 are raised and moved in the rear direction, followed by lowering of forks 120, 320 to further move pallet 600 rearward relative to body 110. Such processes may be repeated to better balance pallet 600 on body 110.

Figure 8:
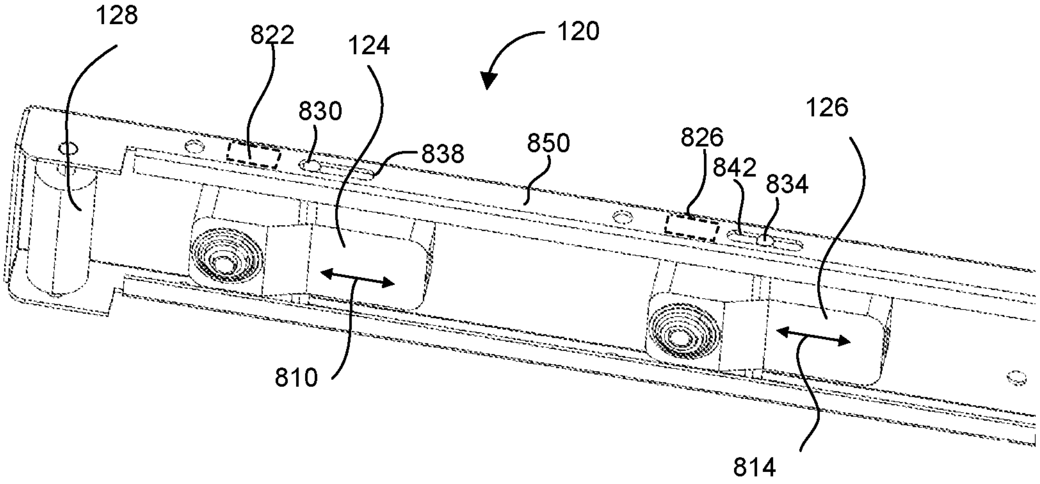
FIG. 8 is a perspective view of a fork with sets of expanding columns, according to one embodiment.

Further, the longitudinal locations of lifting devices 124, 126, 424, 426 may be adjusted to distribute weight more evenly during the raising operation. FIG. 8 is a perspective view of fork 120 with sets of expanding columns, according to one embodiment. Forks 120 includes sliding actuators 822, 826 that are activated to move lifting devices 124, 126 in a longitudinal direction of forks 120 as shown by arrows 810, 814. Sliding actuators 822, 826 are controlled by controller circuit 336 to move by a distance according to the dimension of pallet 600 as determined by processing the images captured by cameras 370, 374 and other sensors.

To slidably secure lifting devices 124, 126, frame 850 of fork 120 may be formed with a set of slits 838, 842 at its side and another set of slits (not shown) at its opposite side to accommodate ends of pins 830, 834 secured to lifting devices 124, 126. Pins 830, 834 slide with their ends in slits 838, 842 in a longitudinal direction of forks 120 by the activation of sliding actuators 822, 826.

Figure 9:
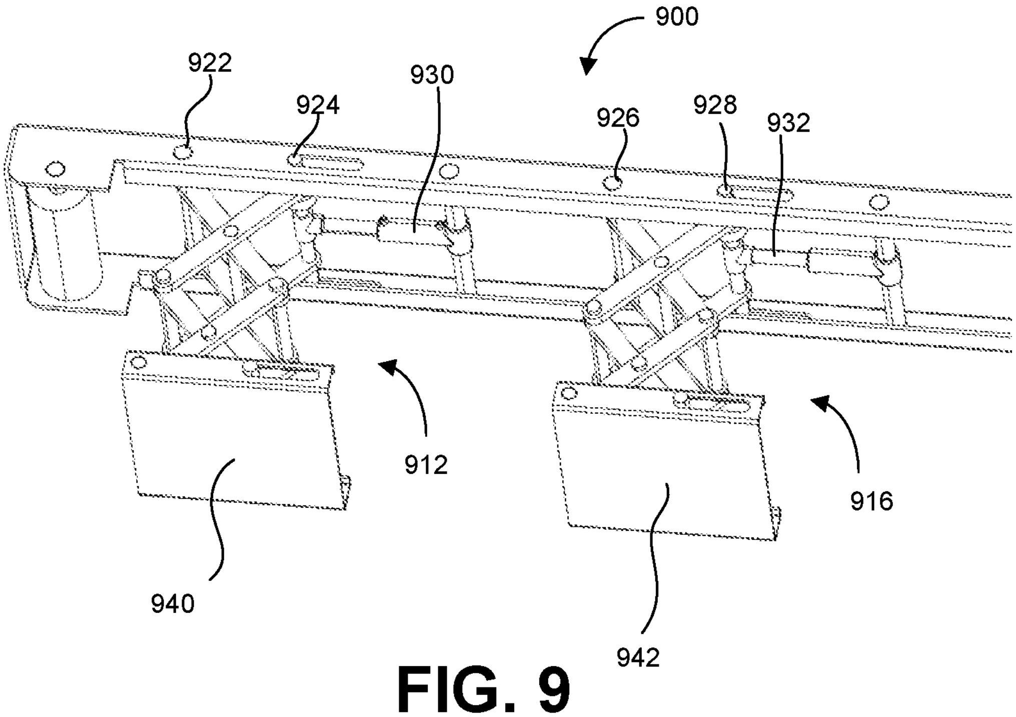
FIG. 9 is a perspective view of a fork with jacks, according to one embodiment.

FIG. 9 is a perspective view of fork 900 with jacks 912, 916, according to one embodiment. Instead of using sets of columns, fork 900 include actuators 930, 932 that operate jacks 912, 916 by pushing or pulling their leg segments connected to pins 914, 928 sliding within slits formed in the frame of fork 900. The opposite leg segments of jacks 912, 916 may be fixed by pins 922, 926. Actuators 930, 932 may be embodied as linear motors or hydraulic actuators, depending on the source of energy. Jacks 912, 916 may include feet 940, 942 to contact the ground surface. In one or more embodiments, jacks 912, 916 may also be movable in the longitudinal direction of fork 900 by using separate actuators (not shown) that are controlled by controller circuit 336.

Lifting devices may use mechanisms other than what are illustrated in FIGS. 8 and 9. For example, lifting devices may include coil springs with electric motor or hydraulic assist to lift the pallet. Further, fewer or more two lifting devices may be provided in each fork.

Figure 10:
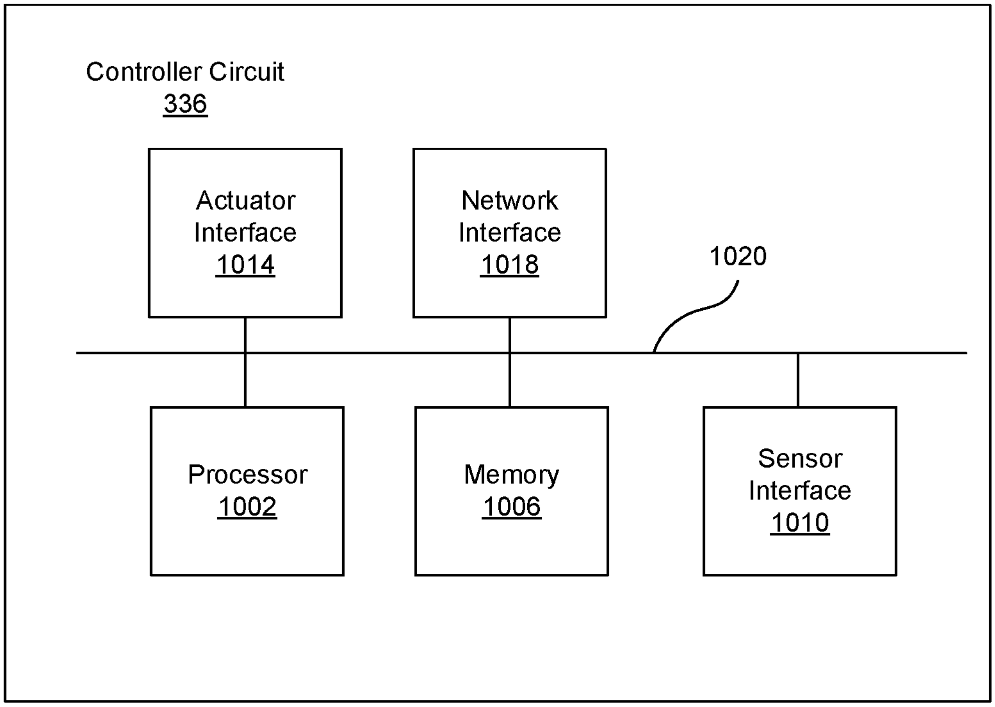
FIG. 10 is a block diagram of a controller circuit, according to one embodiment.

FIG. 10 is a block diagram of controller circuit 336, according to one embodiment. Controller circuit 336 may include, among other components, processor 1002, memory 1006, sensor interface 1010, actuator interface 1014, network interface 1018, and bus 1020 connecting these components. Controller circuit 336 may include components other than what are illustrated in FIG. 10. Alternatively or in addition, one or more components in controller circuit 336 may be combined into a single circuit.

Processor 1002 retrieves and executes commands stored in memory 1006, and may be implemented as central processing unit (CPU), a microcontroller, a graphics processing unit (GPU) or various combinations thereof. Although only a single processor 1002 is illustrated in FIG. 10, multiple processors may be provided for faster processing and/or to expand the types of processing/capability.

Memory 1006 stores software components including, for example, operating systems, image signal processing algorithms, and navigation algorithms such as simultaneous localization and mapping (SLAM) algorithms. Each of these algorithms, when executed by processor 1002, enable autonomous robot 100 to recognize pallets, move between pallet loading and unloading locations, and perform various optimization/adjustment operations. Memory 1006 may also store the map of the environment to enable autonomous navigation.

Sensor interface 1010 interfaces with various sensors such as cameras and proximity sensors. For this purpose, sensor interface 1010 receives sensor signals using relevant communication protocols and forwards the sensor signals to processor 1002 for processing.

Actuator interface 1014 interfaces with actuators in autonomous robot 100 to send control signals. Actuator interface 1014 may send actuator signals using relevant communication protocols to actuators (e.g., actuators 372, 376, lifting devices 124, 126, 42, 426) and motors for driving wheels 112, 114, 412, 414, according to computation operations performed by processor 1002. In one or more embodiments, actuator interface 1014 and second interface 1010 are combined into a single circuit.

Network interface 1018 enables autonomous robot 100 to communicate with external devices. For example, autonomous robot 100 may communicate with other robots or a base station to coordinate their operations. Network interface 1018 operates in conjunction with processor 1002 to send outgoing communication messages to other devices and to receive incoming communication messages using wired or wireless communication protocols.

Figure 11A:
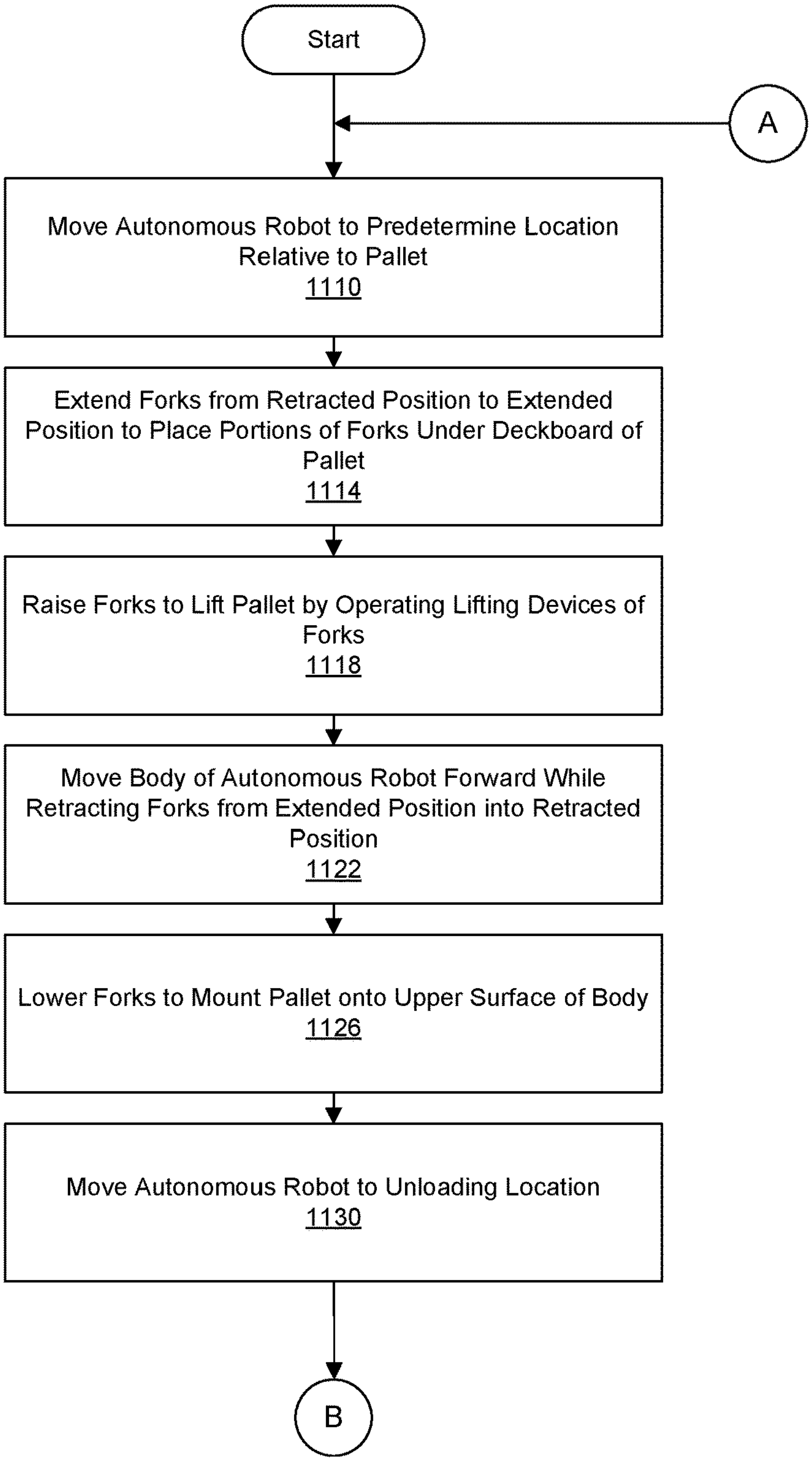
FIGS. 11A and 11B are flowcharts illustrating the operation of the autonomous robot, according to one embodiment.
Figure 11B:
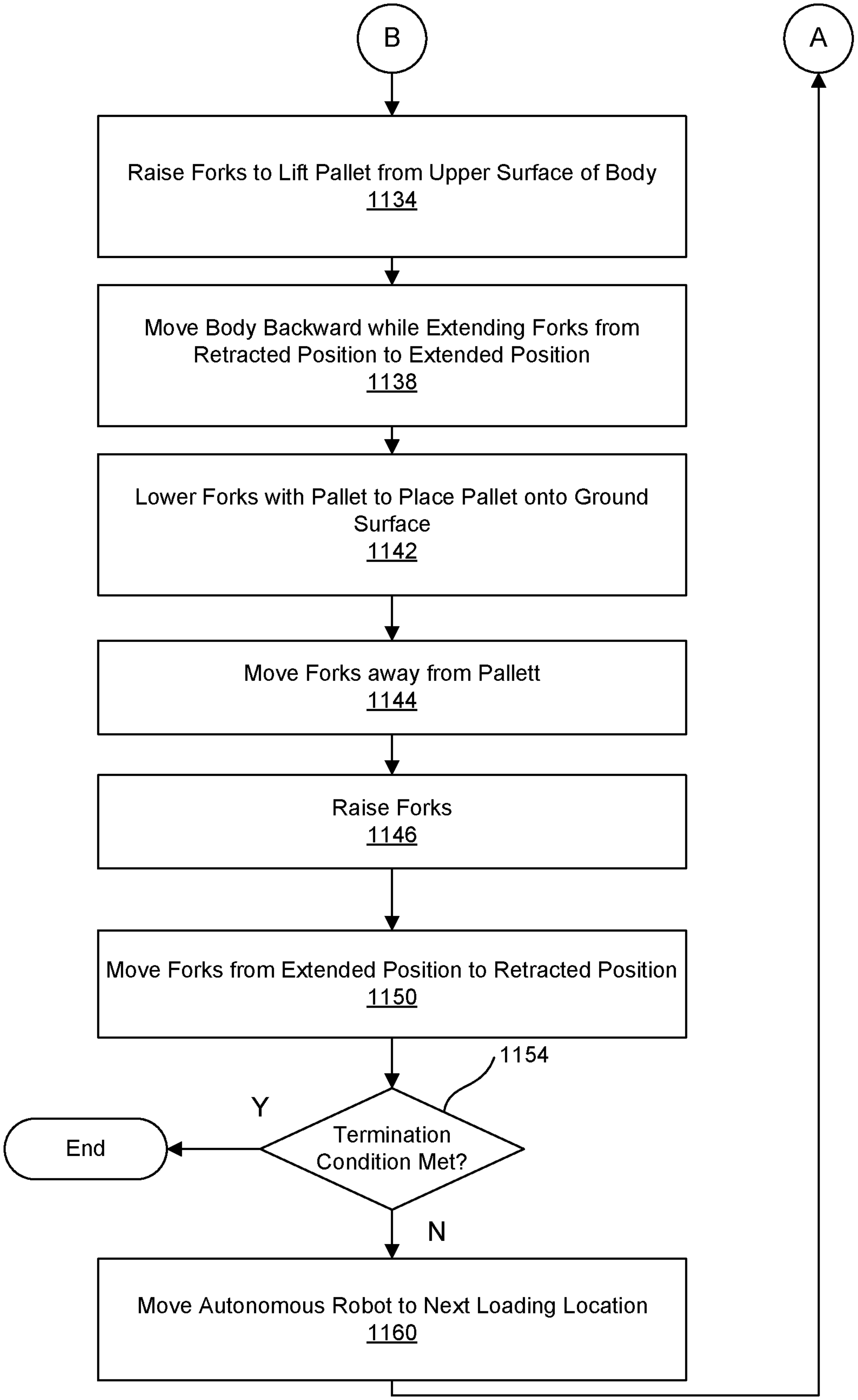

FIGS. 11A and 11B are flowcharts illustrating the operations of the autonomous robot, according to one embodiment. The autonomous robot is moved 1110 to a predetermined location relative to a pallet so that forks may be inserted into entries of the pallet. The forks of the autonomous robot are then extended 1114 from their retracted position to the extended position to place at least portions of the forks under the top deckboard of the pallet.

Then, the forks are raised 1118 to lift the pallet from the ground surface by operating the lifting devices of forks. The body of the autonomous robot is moved forward while retracting 1112 the forks from the extended position to the retracted position. The movement of the body of the autonomous robot and the retraction of the forks are coordinated so that the forks remain in the same location until the body of the autonomous robot is placed under the pallet. The forks are then lowered 1126 to mount the pallet onto the upper surface of the body of the autonomous robot. Wheels of the autonomous robot are then activated to move 1130 the autonomous robot to an unloading location.

After reaching the unloading location, the forks are raised 1134 to lift the pallet from the upper surface of the body of the autonomous robot. Then, the body of the autonomous robot is moved rear=ward while extending 1138 the forks from the retracted position to the extended position. The moving of the body and the extending of the forks may be coordinated so that the pallet remains in a stationary location until the body is no longer below the pallet. Then, the forks are lowered 1142 with the pallet to place the pallet onto the ground surface.

The forks are moved away 1144 from the pallet, either by retracting the forks or by moving the autonomous robot rearward. The forks are again raised 1146, this time without the pallet. Then the forks are moved 1150 from the extended position to the retracted position. It is then determined 1154 whether a termination condition for the operations is satisfied. The termination condition may indicate, for example, a low battery/fuel state of the autonomous robot, finishing all scheduled loading/unloading tasks, detection of any abnormal conditions of components (e.g., sensors, actuators, and processors) or losing network connections.

If the termination condition is met, then the autonomous robot takes actions such as returning to the base station, and terminates its operation. Alternatively, if the termination condition is not satisfied, then the autonomous robot is moved 1160 to the next loading location, and repeats the process of moving 1110 the autonomous robot to a predetermined location and subsequent processes.

Various modifications may be made with respect to the processes illustrated in FIGS. 11A and 11B. For example, additional processes such as adjusting locations of the lifting devices on the forks may be performed before raising 1118 the forks. Further, the process of determining 1154 whether a termination condition is met may be performed before raising the fork 1146.

Although the present disclosure has been described above with respect to several embodiments, various modifications can be made within the scope of the disclosure. Accordingly, the disclosure described above is intended to be illustrative, but not limiting.

What is claimed is:

1. An autonomous robot, comprising:

a body comprising an upper surface onto which a pallet is loaded, the body comprising:

at least one wheel driven to move the body, at least one actuator, and a controller circuit configured to operate the at least one wheel and the at least one actuator; and two or more forks attached to the body and movable relative to the body according to an operation of the at least one actuator by the controller circuit, each of the forks comprising one or more lifting devices operated by the controller circuit to lift the pallet to load the pallet onto the upper surface of the body and lower the loaded pallet to unload the pallet from the upper surface of the body, the one or more lifting devices comprising a set of extendable columns or a jack that selectively come into contact with a ground surface to lift the pallet, wherein each of the forks includes a camera at an end of each of the forks to capture at least a portion of the pallet on the ground surface, the controller circuit configured to control an individual extension distance of each of the forks relative to the body before operating the one or more lifting devices based on images of the pallet captured by the camera.

2. The autonomous robot of claim 1, wherein each of the forks is movable between a retracted position and an extended position, each of the forks placed between leg members of the body in the retracted position, and each of the forks extended away from the legs in the extended position.

3. The autonomous robot of claim 2, wherein the body comprises:

a first leg member of the leg members, the first leg member having a first part of the upper surface, a second leg member of the leg members, the second leg member having a second part of the upper surface, the second leg member extending parallel to the first leg member and spaced away from the first leg member to accommodate a first fork of the two or more forks; and a third leg member of the leg members between the second leg member and the first leg member, the third leg member having a third part of the upper surface, the third leg member extending parallel to the first leg member and the second leg member, the third member spaced away from the first leg member to accommodate a second fork of the two or more forks.

4. The autonomous robot of claim 2, wherein the controller circuit is configured to:

lift the pallet by operating the one or more lifting devices with each of the forks in the extended position, move the body below the pallet by operating the at least one wheel responsive to lifting the pallet in the extended position, move each of the forks into the retracted position from the extended position by operating the at least one actuator responsive to lifting the pallet in the extended position, and lower the pallet onto the upper surface of the body by operating the one or more lifting devices responsive to moving each of the forks into the retracted position.

5. The autonomous robot of claim 4, wherein the controller circuit is configured to:

lift the pallet from the upper surface of the body by operating the one or more lifting devices with each of the forks in the retracted position, move the body away from a location below the pallet by operating the at least one wheel, move each of the forks from the retracted position into the extended position by operating the at least one actuator responsive to lifting the pallet in the retracted position, and lower the pallet onto the ground surface by operating the one or more lifting devices responsive to moving each of the forks into the extended position.

6. The autonomous robot of claim 4, wherein the controller circuit is configured to coordinate the moving of the body and the moving of the each of the forks so that the pallet remains in a stationary location until the body is placed below the pallet.

7. The autonomous robot of claim 1, wherein the body comprises at least one lidar, the controller circuit configured to operate the at least one wheel using signal from the at least one lidar to move the autonomous robot.

8. The autonomous robot of claim 1, wherein the set of extendable columns or the jacks are movable along a longitudinal direction of each of the forks to balance a weight distribution of the pallet and a load of the pallet on the two or more forks.

9. The autonomous robot of claim 1, wherein the body comprises a camera or a proximity sensor at a front portion of the body to detect the pallet, wherein the controller circuit is configured to receive signals from the camera or the proximity sensor to operate the at least one wheel.

10. The autonomous robot of claim 1, wherein the controller circuit is further configured to control the individual extension distance so that each end of the forks does not reach an entry of another pallet adjacent to the pallet based on the captured images.

11. A method of operating an autonomous robot, comprising:

moving the autonomous robot to a predetermined location relative to a pallet by operating at least one wheel of a body of the autonomous robot;

capturing images of at least a portion of the pallet by cameras mounted at ends of two or more forks;

sending signals from the cameras to a controller circuit;

processing the signals at the controller circuit to further move the autonomous robot and to individually operate the two or more forks based on the captured images;

extending the two or more forks from a retracted position into an extended position to place at least portions of the two or more forks under a deckboard of the pallet with lifting devices comprising sets of extendable columns or jacks raised from a ground surface;

raising the two or more forks to lift the pallet by operating lifting devices of the two or more forks by extending the set of extendable columns or jacks to come into contact with the ground surface;

moving the body below the pallet by operating the at least one wheel responsive to raising the two or more forks;

moving the two or more forks from the extended position into the retracted position responsive to raising the two or more forks, wherein the operating of the at least one wheel and the moving of the two or more forks are coordinated so that the pallet remains in a stationary location until the body is located below the pallet; and lowering the two or more forks to mount the pallet onto an upper surface of the body of the autonomous robot.

12. The method of claim 11, further comprising:

moving the autonomous robot by operating the at least one wheel responsive to lowering the two or more forks.

13. The method of claim 12, further comprising:

generating sensor signals by at least one lidar in the body of the autonomous robot;

sending the sensor signals from the at least one lidar to a controller circuit; and processing the sensor signals to determine operations of the at least one wheel by the controller circuit to move the autonomous robot.

14. The method of claim 11, further comprising moving the lifting devices in a longitudinal direction of the two or more forks before lifting the two or more forks to balance a weight distribution of the pallet and a load of the pallet on the two or more forks.

15. The method of claim 11, wherein the two or more forks are accommodated in space between leg members of the body of the autonomous robot in the retracted position.

16. The method of claim 11, wherein extending the two or more forks comprises controlling the two or more forks so that each end of the forks does not reach an entry of another pallet adjacent to the pallet based on the captured images.

17. A non-transitory computer-readable storage medium storing instructions thereon, the instructions when executed by a processor cause the processor to:

move an autonomous robot to a predetermined location relative to a pallet by operating at least one wheel of a body of an autonomous robot;

capture images of at least a portion of the pallet by cameras mounted at ends of two or more forks;

receive signals from the cameras;

process the signals to further move the autonomous robot and to individually operate the two or more forks based on the captured images;

extend the two or more forks from a retracted position into an extended position to place at least portions of the two or more forks under a deckboard of the pallet with lifting devices comprising sets of extendable columns or jacks raised from a ground surface;

raise the two or more forks to lift the pallet by operating lifting devices of the two or more forks by extending the set of extendable columns or jacks to come into contact with the ground surface;

move the body below the pallet by operating the at least one wheel responsive to raising the two or more forks;

move the two or more forks from the extended position into the retracted position responsive to raising the two or more forks, wherein the operating of the at least one wheel and the moving of the two or more forks are coordinated so that the pallet remains in a stationary location until the body is located below the pallet; and lower the two or more forks to mount the pallet onto an upper surface of the body of the autonomous robot.

* * * * *